United States Patent [19]

Rogers et al.

[11] 4,188,508
[45] Feb. 12, 1980

[54] TELEPHONE CALL RESTRICTING APPARATUS

[76] Inventors: Herbert I. Rogers, 558 Hawthorne Ave., Palo Alto, Calif. 94301; Michael C. Chappelle, 9464 Laguna Cr. Dr., Elk Grove, Calif. 95624; Robert G. Brindle, 915 Burnett, San Francisco, Calif. 94131; Patrick A. Brindle, Abbey of the Holy Trinity, Huntsville, Utah 84317

[21] Appl. No.: 935,656

[22] Filed: Aug. 21, 1978

[51] Int. Cl.² ............................................. H04M 1/66
[52] U.S. Cl. ............................................... 179/18 DA
[58] Field of Search ................................... 179/18 DA

[56] References Cited
U.S. PATENT DOCUMENTS

3,920,936  11/1975  Mogtader ..................... 179/18 DA

Primary Examiner—Thomas W. Brown
Attorney, Agent, or Firm—Thomas E. Schatzel

[57] ABSTRACT

A telephone call restricting apparatus for preventing toll calls and including circuitry for sequentially decoding the signals representing each digit of a telephone number, storing the first seven decoded digit signals in binary and converting the stored signals into decimal number signals, a comparator for comparing the decimal number signals corresponding to the appropriate digits of the telephone number with permissable local central exchange digits stored in a programmed memory device, a 90 detector and 0/1 detector for detecting long distance calls, an 800 detector and a 555 detector for detecting toll free long distance calls and logic responsive to both the comparator and the detectors and operative to abort unapproved toll calls.

8 Claims, 5 Drawing Figures

Fig. 1

Fig_2

Fig_3

Fig_5

Fig. 4

TELEPHONE CALL RESTRICTING APPARATUS

BACKGROUND OF THE INVENTION

1. Field of the Invention

The present invention relates generally to telephone accessories and more particularly to a telephone call restricting apparatus for preventing unapproved toll calls.

2. Description of the Prior Art

Unauthorized telephone usage is a universal problem, particularly when the telephone is used to place toll calls. Although numerous telephone accessories have been devised which address the problem, a need still exists for an effective call restriction apparatus which is neither overly restrictive nor easy to circumvent. In other words, an apparatus which permits toll free long distance calls such as those to an "(800)" or area code plus "555" number, but which prevents operator assisted and local toll calls.

To better understand the problem, a review of the various telephone number categories comprising the direct distance dialing system is in order. The first category includes the one to four pre-prefix digits often required in a private branch exchange (PBX) system. For example, many such systems require that a "9" be dialed in order to get an outside line.

The second category includes the one to three prefix digits required in certain parts of the country. For example, in some locations a "1" must be dialed before a long distance call is dialed.

The third category includes a three digit number required to place a long distance call. This three digit area code number must be dialed when wanting a toll number outside the dialing area code. An area code is easily distinguished from the fourth category three digits representing the central office category, since the second digit of an area code must be either a "0" or a "1". The second digit of a central office code, like the first digit of the area code category, is limited to the digits "2" through "9".

The fifth and final category of numbers includes four digits which comprise the local number.

Numerous prior art devices exist which place restrictions on the use of a particular telephone device. These devices include simple dial locks and sophisticated computer systems such as the one disclosed in the U.S. Pat. No. 3,931,476 of Gordon H. Matthews and which prevents calls from being completed unless a computer-verified user identification number is first dialed.

Another class of restriction devices monitor the telephone number as it is being dialed and prevent completion of those calls which meet certain conditions. For example, in U.S. Pat. No. 3,681,536, Pask et al disclose a device for preventing the dialing of those long distance calls in which a long distance prefix digit is required by aborting all calls in which the first digit dialed is a "1".

Recognizing that the second digit of an area code is either a "0" or a "1", Piacente et al suggested device in U.S. Pat. No. 3,899,640 for aborting those calls in which a "0" or a "1" is the second digit dialed.

Further realizing that an operator assisted call may be a toll call, Klaiber et al disclosed a device in U.S. Pat. No. 3,680,762 for additionally aborting calls in which the first digit dialed is a "0".

A somewhat different approach is taken by Chan et al who disclosed a device in U.S. Pat. No. 3,980,836 for not only inhibiting calls in which the first digit dialed in a "0" but also those calls in which the number of digits dialed is in excess of that required for a local call.

A much more elaborate device is disclosed by Downs et al who disclosed a device in U.S. Pat. No. 3,851,109. In general, the device may be programmed to respond to the dialing of a preprogrammed disallowed digit after a preprogrammed number of digits have been dialed and operate to set a latch. Next, if an override signal is not generated, following the dialing of a predetermined number of digits the call is aborted.

The device further includes programmable code detectors which respond to preselect patterns of digits and operate to generate the override signal. Examples of the preselected patterns include the area code "(213)" and the information number "1-(XXX)-555-1212".

Finally, the device includes a timer to detect further dialing following the termination of a previous call.

Concerned with preventing local toll calls, Rolen et al disclose in U.S. Pat. No. 3,985,972 a device for comparing the signals representing the central office digits of a telephone number to a prestored table of central office toll-free numbers for aborting dialed unapproved toll calls. To further prevent operator assisted toll calls a circuit is included for aborting those calls in which the first dialed digit is a "0".

A problem with the device of Rolin et al is that it fails to recognize calls which include a prefix digit or those in a PBX environment in which a pre-prefix digit is employed.

Another problem with prior art devices for preventing long distance calls is that they also prevent toll-free long distance calls such as those including an "(800)" area code or an area code plus "555" central office code.

SUMMARY OF THE PRESENT INVENTION

It is therefore an object of the present invention to provide a novel call restricting apparatus which prevents only unapproved toll calls.

Briefly, the preferred embodiment of the present invention includes a dialing decoder for converting the signals representing each digit of a telephone number generated by a rotary type telephone switch dial to binary number signals, a touch-tone decoder for converting the signals representing each digit of a telephone number generated by a dual-tone multifrequency or touch-tone telephone device to a binary number signal, a register bank and decoder bank for storing the binary coded digit signals and converting them to decimal format, a counter for determining the number of digits which have been dialed, a memory device and a comparator for detecting toll calls by comparing the stored signals which represent the central office digits against an array of authorized ones, a 90 detector responsive to the decoded signals representing the first two digits for detecting operator-assisted calls, a 0/1 detector responsive to the decoded signals representing the second area code digit for detecting long distance calls, a 555 detector and an 800 detector responsive to the decoded signals representing the central office and the area code digits, respectively, for detecting long distance free calls, and a control logic responsive to the counter, the detectors and the comparator and operative to abort unapproved toll calls.

A principal advantage of the present invention is that only those long distance calls which are unapproved toll calls are aborted.

Another advantage of the present invention is that it is compatible with a PBX system.

These and other objects and advantages of the present invention will no doubt become apparent to those skilled in the art after having read the following detailed description of the preferred embodiment which is illustrated in the several figures of the drawing.

DETAILED DESCRIPTION OF THE PREFERRED EMBODIMENT

Figure 1:
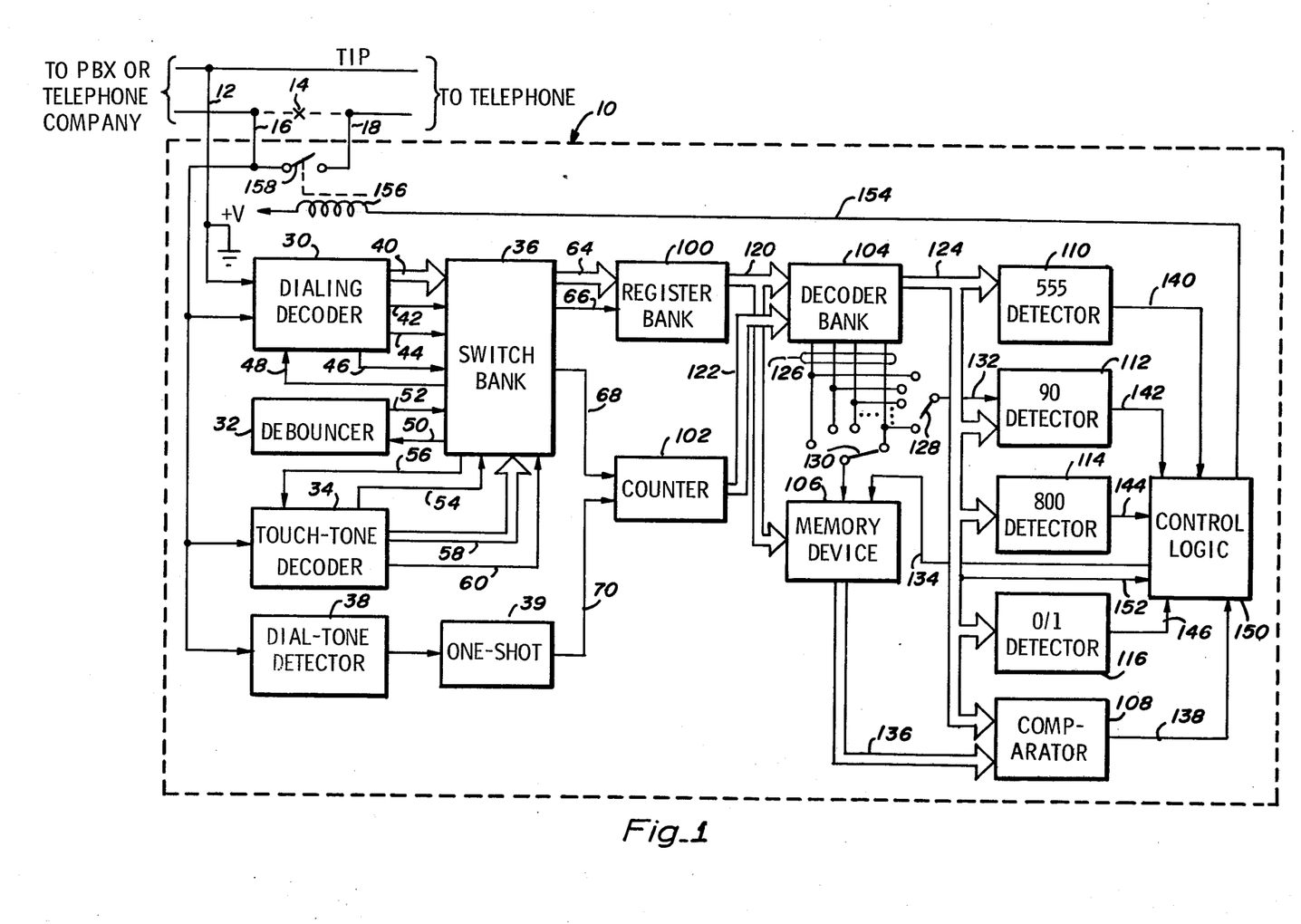
FIG. 1 is a block diagram illustrating a call restricting apparatus is accordance with the present invention.

Turning now to FIG. 1, a preferred embodiment of a telephone call restricting apparatus in accordance with the present invention is generally designated by the numeral 10. The apparatus, as illustrated, is connected to a pair of telephone lines including a tip line which is connected to the device by a line 12, and a ring line which is broken as illustrated at 14 for connection to the device. The portion of the ring line on the telephone company or private branch exchange (PBX) side of the break is connected to the device by a line 16, and the other side of the ring line is connected to the device by a line 18.

The call restricting device may be functionally viewed as divided into three portions including a portion for decoding the signals developed during dialing, a portion for storing the decoded dialed signals and for detecting certain dialed number sequences therefrom and a logic portion for determining if a call should be aborted. The dialing decoding section includes a dialing decoder 30, a debouncer 32, a touch-tone 34, a switch bank 36, a dial tone detector 38 and a one-shot circuit 39. Dialing decoder 30 has a first input connected by a line 16 to the ring line of the telephone line pair and a second input connected by line 12 to circuit ground (optional) and the tip line of the telephone line pair.

Although in this application the term "dialing" is used to include both that process whereby a rotary dial device is used to pulse the telephone line and the process whereby a push button device is used to generate dual-tone, multifrequency (DTMF), or touch-tone signals, decoder 30 is only responsive to the pulses generated by the former device. The decoder 30 is responsive to these pulses and operative to generate on an output bus 40 a binary signal representing each digit of the telephone number as it is dialed. The decoder is further operative to generate a clocking signal on a line 42 and a counter driving signal on a line 44 following the dialing of each digit of the telephone number.

Since both dialing decoder 30 and touch-tone decoder 34 employ a debouncer to prevent a portion of their respective circuits from being falsely triggered by spurious signals which are generated when the dial switch or DTMF switches are closed, a common debouncer circuit, debouncer 32 is employed. Thus, decoder 30 has a signal output connected to a line 46 and a signal input connected to a line 48 for connection to the debouncer.

Debouncer 32 has both an input and an output which are connected to the switch bank 36 by a line 50 and line 52, respectively, for selective connection to either lines 46 and 48 or to a line 54 and a line 56 connected to the touch-tone decoder 34.

Touch-tone decoder 34 further has an input which is connected to line 16 for receiving DTMF dialing signals developed between the tip and ring lines of a telephone line pair. Responsive to these signals, decoder 34 develops binary signals on a bus 58 representing each digit of the telephone number as it is dialed. The decoder further develops a clocking signal on an output connected to a line 60 and a counter driving pulse. Since the counter driving pulse is debounced by debouncer 32 and thus available at the switch bank, no line corresponding to line 44 is used.

Dependent upon whether a rotary dial or a DTMF-type telephone device is used with the call restricting apparatus, switching elements in 2-position switch bank 36 select the appropriate decoded dialing signals. More specifically, in a first position switch 36 connects bus 40 to a bus 64, line 42 to a line 66, and line 44 to a line 68. In this position, the switch bank also connects lines 50 and 52 to lines 46 and 48, respectively, to connect debouncer 32 to dialing decoder 30.

In a second state, lines 50 and 52 of debouncer 32 are connected to lines 54 and 56 of touch-tone decoder 34, respectively. Further, bus 58 and lines 60 and 52 are connected to bus 64, and lines 66 and 68, respectively.

Dial tone detector 38, which has an input connected to line 16, includes circuitry which is responsive to the dial tone signal developed on the telephone line pair prior to dialing and with the one-shot circuit 39 is operative to develop a counter resetting signal on a line 70 common to either rotary dialing or DTMF dialing.

The storing and detecting portion of the call restricting apparatus includes as principal components a register bank 100, a counter 102, a decoder bank 104, a memory device 106, a comparator 108, a 555 detector 110, a 90 detector 112, an 800 detector 144, and a 0/1 detector 116.

Register bank 100 has signal inputs connected to bus 64 and line 66 and develops output signals on a bus 120. The register bank 100 includes a number of logic storage elements arranged to store the binary number signals representing at least a portion of the dialed digits of the telephone number. Coincident with each clocking pulse developed on line 66, the binary signal levels representing the previously-dialed digit are stored. Thereafter, these signal levels and those representing previously-dialed digits stored in the register bank are continuously developed on bus 120, the bus being the respective contents of each register.

Counter 102, which has inputs connected to line 68 and line 70 and outputs connected to a bus 122, is responsive to counter driving pulses developed on line 68 as each digit of the telephone number is dialed and operative to develop a binary signal on bus 122 indicative of the number of digits which have been dialed. The state of the counter is reset by the pulse developed on line 70 by dial tone detector 38 and the one-shot circuit 39 in response to a dial tone signal generated on the telephone line pair, when the phone receiver is first lifted off-hook.

Decoder bank 104 includes a number of decoder elements each having inputs connected to the bus 120 for receiving those binary coded signals which represent one digit of the dialed telephone number and having outputs connected to a bus 124. Each decoding element uniquely decodes those binary signals which represent a respective digit of interest to develop a logic level signal on the selected output. In other words, responsive to signals representing the digit "3", the third output is selected.

Also included in decoder bank 104 is an additional decoder element having inputs connected to bus 122 for receiving the binary signals representing the count of the number of digits dialed and outputs connected to a bus 126. To compensate for variations in the number of pre-prefix and prefix digits which may be required in different locations, a switch 128 and a switch 130 are employed. A selected line of bus 126 is connected to a line 132 by switch 128, and another selected line of bus 126 is connected to a line 134 by a switch 130. Typical settings for switches 128 and 130 in a PBX environment employing one pre-prefix digit and no prefix digits are such that an output is generated on line 132 after the second digit has been dialed, respectively.

Memory device 106 has eight addressing inputs connected to bus 120, a device enable input connected to line 134 and eight data outputs connected to an eight line bus 136, each line of bus 136 representing one of the eight possible first central office digits "2" through "9". When signals representing the second and third digits in binary of the central office portion of a telephone number are used to index the memory device, it develops on each of the lines of bus 136 a signal which indicates whether the digit represented by the line in in combination with the indexing second and third digits correspond to an approved toll call.

Comparator 108 has eight inputs connected to bus 136, eight inputs connected to bus 124 for receiving the signals representing the decoded first digit of the central office portion of the telephone number and develops an output on a line 138. The comparator uses the decoded signal developed on bus 124 to gate the appropriate signal of those developed on bus 136 to line 138 to indicate whether the central office digits of a telephone number dialed corresponds to a toll call.

The 555 detector 110 which has inputs connected to the appropriate lines of bus 124 is responsive to signals indicative that all three of the dialed central office digits are "5" and is operative to generate a disconnect override signal on a line 140 to permit toll-free long distance information calls.

Detection of operator-assisted toll calls is accomplished by the 90 detector 112 which has an enable input connected to a line 132 and gating inputs connected to the appropriate lines on bus 124. The detector 112 may be adapted to respond to either the dialing of a "9" followed by a "0" or just a "0" and operate to generate a call disconnect signal on line 42.

Connected to appropriate lines of bus 124, the 800 detector 114 is responsive to those signals indicating that the area code "(800)" has been dialed and operative to generate a disconnect override signal on a line 144.

A determination that a long distance call is being dialed is accomplished by 0/1 detector 116. This detector has inputs connected to bus 124 for receiving signals which indicate that the second digit of the area code is either a "0" or a "1" and responsive thereto generates a disconnect signal on a line 146.

The decision to abort a telephone call is made by a control logic 150. The logic has inputs connected to lines 138, 140, 142, 144 and 146 for receiving the disconnect or disconnect override signals. The logic further has an enable output which is connected to line 134, an input which is connected to a line 152 of bus 124 for receiving a signal which indicates that the first digit dialed was a "9" and an output which is connected by a line 154 and relay 156 to a power supply potential.

The logic is normally operative to generate a suitable relay driving signal on line 154 to maintain closure of an associated set of relay contacts 158 which complete the connection of the ring line to permit normal operation of the associated telephone. Responsive to a disconnect command signal generated on either line 142, 146 or line 138, the logic generates a pulse on line 154 causing the relay to momentarily break connection to the telephone preventing completion of the dialed call.

When signals are generated on lines 134 and 152 indicating that the appropriate number of digits have been dialed and that the first digit is a "9", the logic responds to the signals developed on lines 140, 144 and 146. More particularly, absent an override signal generated on either line 140 or line 144, the logic will generate the relay driving pulse in response to a disconnect command signal generated on line 146 or 138.

Operationally, when the receiver of the associated telephone device is initially removed from the hook and a dial tone signal is generated between the telephone line pair, dial tone detector 38 and associated one-shot circuitry 39 will generate a reset signal on line 70 clearing, or zeroing, the counter 102.

Dependent upon the type of dialing signal which is generated between the telephone line pair, either dialing pulses will be counted by dialing decoder 30 or DTMF signals will be decoded by touch-tone decoder 34 for coupling by switch 36 to register bank 100 and counter 102. In either case, as each digit of the telephone number is dialed, binary signals corresponding to that digit of the telephone number are generated on bus 64 and clocked into register bank 100 by the clocking pulse developed on line 66. Also, counter 102 is incremented by the signal developed on line 68.

After two digits have been dialed (in the PBX configuration) as determined by the signal developed on line 132, if a "9" and a "0" have been dialed, the 90 detector 112 will generate a disconnect command signal on line 142 causing control logic 150 and relay 156 to abort the call.

After seven digits have been dialed (in the PBX configuration), the signals representing the third digit (second area code digit) are examined for a "0" and a "1". If either is detected, a disconnected command signal is generated by the 0/1 detector 116 on line 146. Although detector 116 has determined that a long distance call has been dialed, it is possible that this call is to be a toll-free number. For this reason, the dialed telephone number is further scrutinized by the 555 detector 110 and the 800 detector 114 which examine the fifth through seventh (central office) digits and second through fourth (area code) digits, respectively. Should detector 110 or detector 114 determine that the long distance call is to a toll-free number, an override signal will be developed on line 140 or 144, respectively. Absent such an override signal, control logic 150 causes relay 156 to abort the call.

In addition, the third and fourth digits (second and third central office digits) are used to access central office prefixes stored in memory device 106. The index signal is compared in comparator 108 with the decoded second (first central office) digit to determine if an approved toll call has been dialed. If it is determined that the call is indeed a toll call number which is not stored in memory device 106, a disconnect command signal is developed on line 138 which also causes control logic 150 and relay 156 to abort the call.

Figure 2:
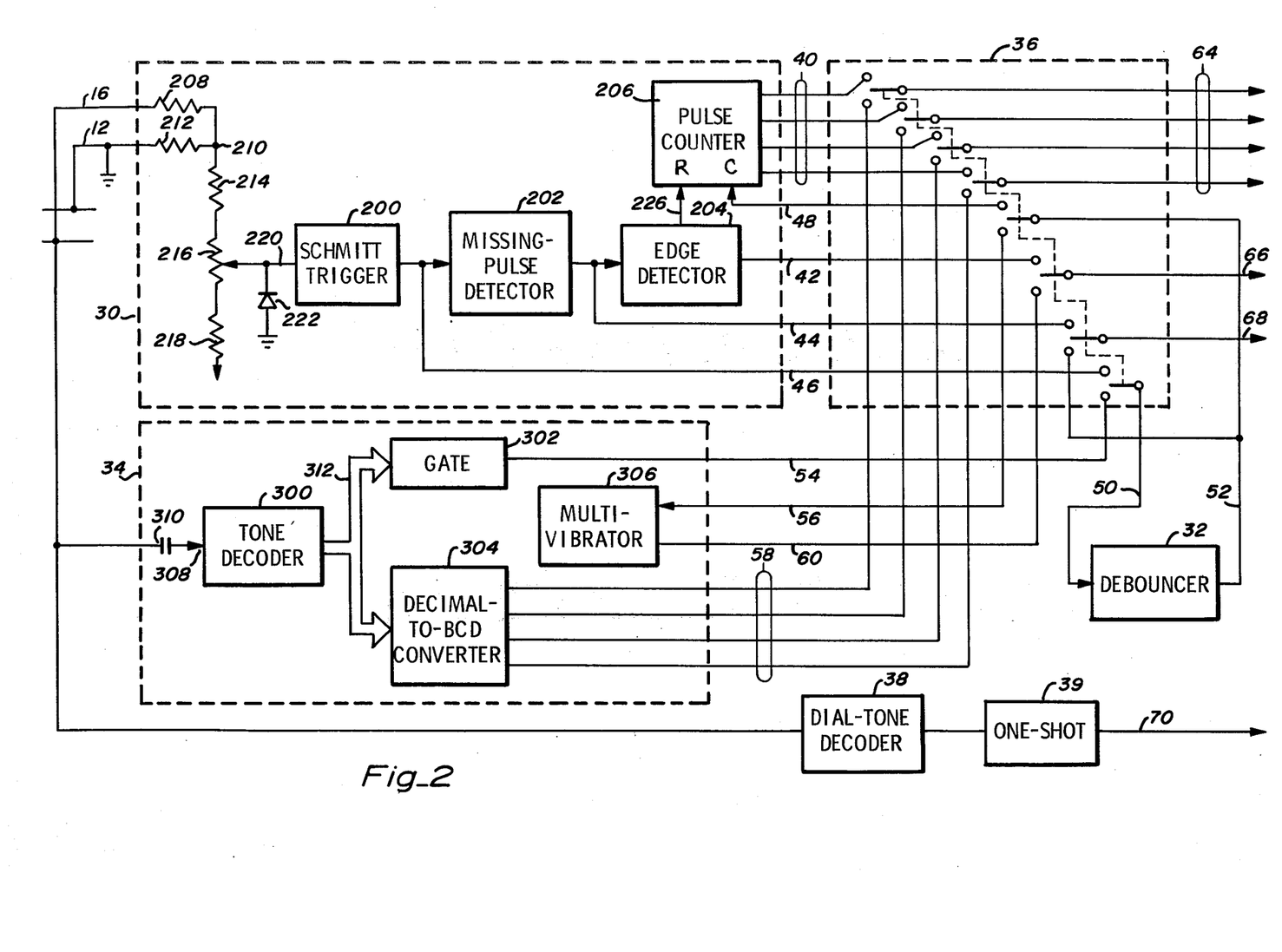
FIG. 2 is a block diagram further illustrating those components of the call restricting apparatus illustrated in FIG. 1 which decode the dialed digit signals.

A preferred embodiment of the dialing signal decoding portion of the telephone call restricting apparatus is illustrated in FIG. 2. As shown, dialing decoder 30 includes as active components a Schmitt trigger 200, a missing pulse detector 202, an edge detector 204 and a pulse counter 206. The potentials developed on the telephone list pair are converted to those required by the integrated circuit devices by a voltage divider comprised of a resistor 208 connected between line 16 and a node 210, a resistor 212 connected between line 12 and node 210 and a resistor 214, a potentiometer 216, and a resistor 218 connected in series between node 210 and a 5-volt power supply potential.

Preferably, resistor 212 has an impedance of approximately one megohm and resistor 208 an impedance of ten megohms so as to provide a high degree of isolation from the telephone line pair. Resistors 214, 218, and the setting of potentiometer 216 are chosen such that when approximately 48 volts is developed between the telephone line pair, a near ground potential is developed at the wiper of potentiometer 216. In a preferred embodiment, the resistor 214 had a value of ten megohms, resistor 218 had a value of five hundred kilohms, and the potentiometer 216 was set at five hundred kilohms. Thus, as 48-volt pulses are developed between the telephone line pair during dialing, the potential developed at the wiper of the potentiometer 216 changes from a level of below lower threshold of the Schmitt trigger 200 of approximately zero volts to a level of approximately 3 to 3.5 volts which is beyond lower threshold of the Schmitt trigger 200.

Schmitt trigger 200 has an input connected to the wiper of potentiometer 216 by a line 220 and to circuit ground by a clamping diode 222. The diode prevents negative excursions of the potential on line 220 in excess of the diode voltage drop to protect the Schmitt trigger. The Schmitt trigger is operative to shape the pulses developed on line 220 and convert them to the standard logic levels. Preferably, the Schmitt trigger includes a device such as that designated 74C14 by the Fairchild Camera and Instrument Corporation and a CMOS buffer and inverting amplifier device such as that designated 34049.

The output of Schmitt trigger 200 is connected to line 46 and the missing pulse detector 202 which has an output connected to line 44. Preferably, detector 202 includes an integrated circuit timer such as that designated 555 which functions as a retriggerable one-shot multivibrator having a pulse width in excess of the normal period of the pulses comprising one dialed telephone number digit. Since the pulse spacing between the last pulse of a given dialed digit and the first pulse of the succeeding digit is considerably longer than the period for successive pulses of a given digit, one inverted detected pulse is generated on line 44 for each dialed digit of the telephone number.

Detector 204, which has an input connected to line 44, develops on line 226 a pulse coincident with the leading (falling) edge of each pulse developed on line 44 and develops on line 42 a pulse coincident with the trailing (rising) edge of each pulse developed on line 44. Preferable, the detector 204 is a dual-retriggerable multivibrator such as that designated 74123.

Pulse counter 206 is a four-bit counter having a reset input connected to line 226, a clocking input connected to the output of Schmitt trigger 200 by line 48, debouncer 32 and line 46, and a binary sum output connected to bus 40. In the preferred embodiment a device such as that designated 74192 is used for the counter.

Operationally, as each digit of a telephone number is dialed using a dial-type telephone device, pulses having a magnitude of approximately 48 volts are developed between the telephone line pair. These pulses are converted in level by the voltage divider to pulses of amplitude suitable for driving Schmitt trigger 200. With additional reference to FIG. 3, a series of three pulses including pulses 250, 252 and 254 followed by a series of two pulses and a series of four pulses, such as might be generated on line 220 when the digits "3", "2" and "4" are dialed, are illustrated. These pulses, after being shaped by Schmitt trigger 200 drive missing pulse detector 202.

Figure 3:
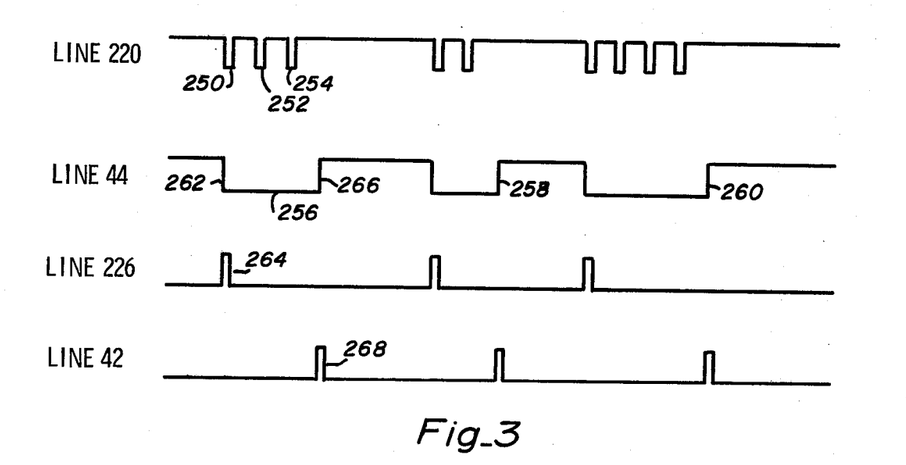
FIG. 3 is a timing diagram of the decoder portion of the call restricting apparatus illustrated in FIG. 2.

Once triggered by pulse 250, missing pulse detector 202 is retriggered by succeeding pulses in the series, pulses 252 and 254, to generate on line 44 one pulse such as that illustrated at 256 having a width in excess of the series length. In a similar fashion, successive groups of pulses trigger the missing pulse detector which in response thereto generates pulses such as those illustrated at 258 and 260.

Responsive to the leading edge 262 of pulse 256, the edge detector 204 generates on line 226 a pulse such as that illustrated at 264. Edge detector 204 is further responsive to the trailing edge 266 of pulse 256 and operative to generate a clocking pulse on line 42 illustrated at 268.

Pulse 264 is operative to reset counter 206 which thereafter counts the series of pulses, including pulses 250, 252, and 254, which are coupled to the clocking input of the counter by debouncer 32. Thus, when pulse 268 occurs, counter 206 will be generating on bus 40 a binary signal which in this case represents the digit "3".

Referring again to FIG. 2, Touch-Tone decoder 34 is shown to include a tone decoder 300, a gate 302, a decimal-tobinary coded decimal (BCD) converter 304, and a multivibrator 306. Tone decoder 300, which has an input 308 connected by a capacitor 310 to line 16 includes circuitry which is responsive to the DTMF signals developed between the telephone line pair and operative to generate signals on a seven-line output bus 312 indicative of the frequencies of the tones comprising each DTMF signal.

In the preferred embodiment tone decoder 300 includes seven-phase locked loop devices each having an input connected to terminal 308 and which are tuned to a separate one of the seven DTMF signal frequencies. In addition, tone decoder 300 includes ten, two-input OR gates such as those designated 7432. Each OR gate has inputs which are connected to the outputs of two appropriate phase-locked loop devices each having an input connected to terminal 308 and which are tuned to a separate one of the seven DTMF signal frequencies. In addition, tone decoder 300 includes ten, two-input OR gates such as those designated 7432. Each OR gate has inputs which are connected to the outputs of two appropriate phase-locked loop devices and an output which is connected to a respective one of the lines of bus 312, such that in response to the DTMF signals representing a given telephone number digit, a signal is generated on a corresponding one of the lines of bus 312.

Gate 302, which in the preferred embodiment includes a ten-input positive NAND gate such as that designated eight input 7430 NAND and associated 2-7402's and 2-7430's to provide additional two NAND function to complement eight-input NAND 7430 for all ten digits 0 through 9. The gate 302 is responsive to a signal developed on any of the lines of bus 312 and operative to generate a signal on line 54.

Decimal-to-BCD converter 304, which has inputs connected to bus 312 and develops outputs on bus 58, includes a ten-line to four-line decoder device such as that designated 74147 which is connected to bus 312 and four inverter devices such as those designated 7404 which are connected between the outputs of the decoder device and the lines of bus 58.

Multivibrator 306 includes a positive edge-triggered retriggerably multivibrator such as that designated 74132 which in response to the signal generated by gate 302 on line 54 and which is coupled to the multivibrator by debouncer 32, generates a clocking pulse on line 60.

Debouncer 32 includes a retriggerable one-shot multivibrator such as that designated 74123, and dial tone detector 38 includes a phase lock loop device such as that designated LM567 which is tuned to the frequency of the dial tone signal developed between the telephone line pair.

The two position switch bank 36 includes switching elements for selectively connecting bus 64 to either bus 40 or bus 58, line 52 to line 48 or line 56, line 66 to line 42 or line 60, line 68 to line 44 or line 52, and line 50 to line 46 or line 54. As illustrated, switch bank 36 includes a number of mechanical switching elements. It is understood however, that electronic switching or gating elements may also be employed.

Figure 4:
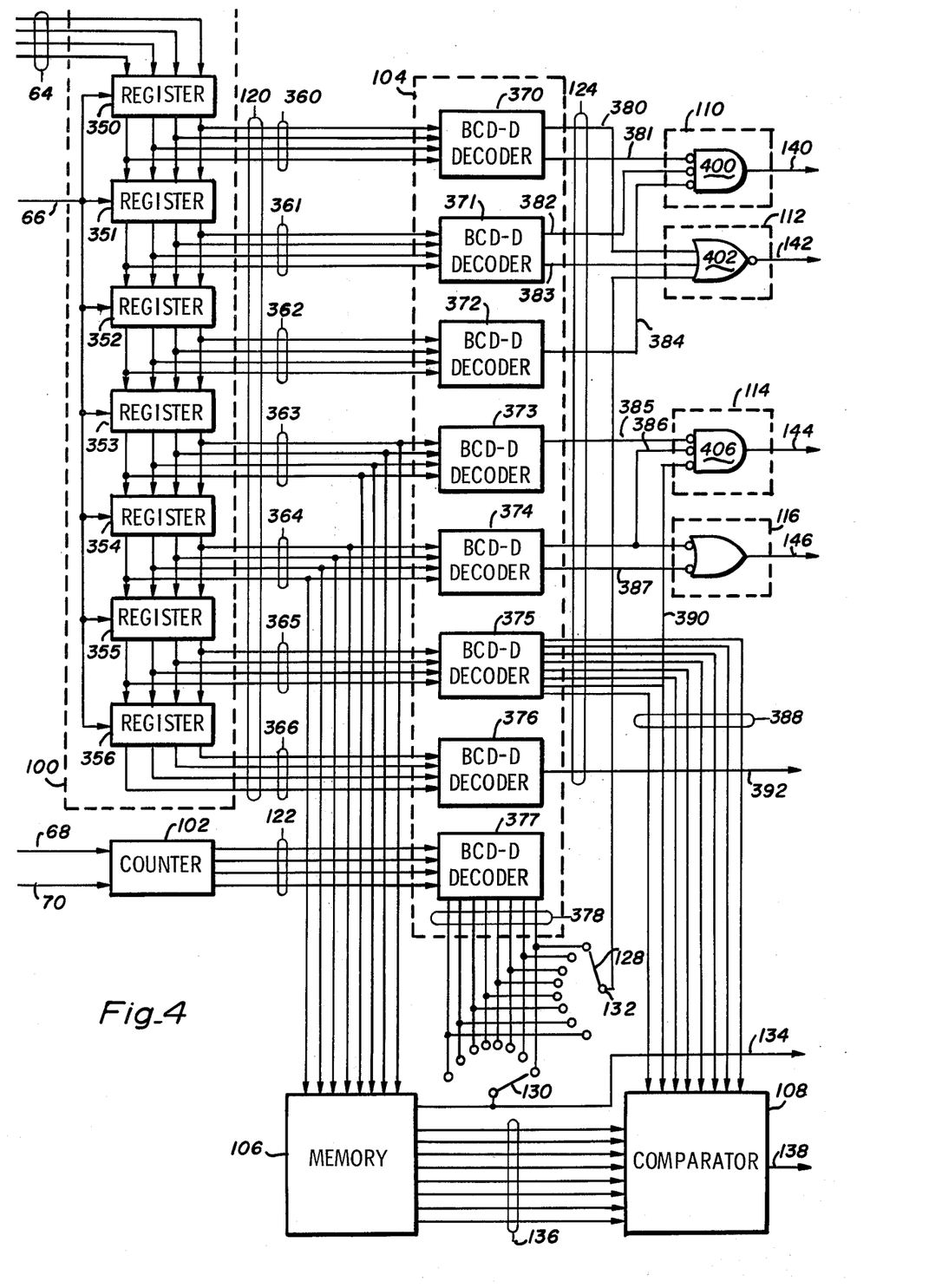
FIG. 4 is a block diagram further illustrating the storage and detecting portion of the call restricting apparatus illustrated in FIG. 1.

Turning now to FIG. 4, a portion of the telephone call restricting apparatus which stores and decodes the dialed digit signals is illustrated. In the preferred embodiment, register bank 100 includes seven serially-connected register devices such as those designated 74194 and which are designated in the figure by the numbers 350 through 356. Register devices 350 through 356 have data inputs connected to bus 64 and six buses 360 through 365 and have data outputs connected to buses 360 through 365 and a bus 366, respectively. Buses 360 through 366 comprise bus 120. Each of the register devices also has a load input which is connected to line 66.

Coincident with a clocking pulse developed on line 66, data stored in each register is advanced one register and new data is loaded into register 350. In other words, upon receipt of the clocking pulse register 350 stores the binary signals representing the digit of the telephone number which was most recently dialed. At this time, registers 351 stores the binary signals representing the second most recently dialed digit which was previously stored in register 350, etc.

In the preferred embodiment seven register devices such as those designated 74194 are employed. In an alternative embodiment described below, however, additional register devices are employed. Futher, it is anticipated that four serially-shaped register devices, each having clocking input connected to line 66, a serial input connected to a respective one of the lines of bus 360 through 366 may also be employed.

Counter 102 which has an input connected to line 68, a clocking input connected to line 70, and outputs connected to the four-line bus 122 is preferably a four-bit counter device such as that designated 74192.

Preferably, decoder bank 104 includes eight BCD-to-decimal or ten-line to four-line, decoder devices such as those designated 7442 and which are designated in the figure by the numbers 370 through 377. Decoder devices 370 through 376 have inputs connected to buses 360 through 366, respectively, and develop outputs, selected ones of which are connected to bus 124. Decoder 377 has inputs connected to bus 122 and develops outputs on a ten-line bus 378.

Since each decoder device develops a low signal level on an output which is designated by its binary input signal, it is convenient to designate the outputs on which such a signal is developed in response to binary signals one through nine and zero as outputs one through nine and zero, respectively. Under this system, outputs zero and five of decoder 370, outputs five and nine of decoder 371, output five of decoder 372, output zero of decoder 373 and outputs zero and one of decoder 374 are connected to eight lines of bus 124 designated 380 through 387, respectively. An eight-line bus 388 is connected to outputs two through nine, respectively, of decoder 375, the eighth line of the bus also being designated by the number 390. The ninth output of decoder 376 is connected to a line 392 for 800 telephone numbers.

In a PBX environment, the second and seventh outputs of decoder device 377 are typically connected by switches 128 and 130 to lines 132 and 134, respectively, and in non-PBX applications the first and sixth outputs of decoder device 377 are typically connected by the switches to lines 128 and 130, respectively.

In an alternate embodiment employed where a prefix number is used, an additional register device and decoder device are employed to handle the additional digit. Of course, in this embodiment the connections to the respective decoder devices are adjusted by shifting as required to accommodate the extra digit. Preferrably, the connection to the 555 detector 110, the 800 detector 114, and the 0/1 detector 116 are connected to decoder bank 104 by switches permitting the call restricting device to be adjusted to operate both with and without a pre-prefix digit.

It is anticipated that since not all outputs of the decoder devices are utilized, it may be advantageous to alternatively utilize other decoder devices or gates.

As indicated, memory device 106, which is preferably a device such as that designated 82S140 and which is preprogrammed with central office exchange digit information, includes eight addressing inputs, four of which are connected to bus 364 and four of which are connected to bus 363. The device also includes a chip enable input connected to line 134 and eight data outputs connected to the eight line bus 136.

Comparator 108 preferably includes eight, two-input NAND gates such as those designated 7400 and one, eight-input NAND gate such as that designated 7430. The two-input NAND gates each have an input connected to one line of bus 136 and a second input connected to a corresponding line of bus 388. The eight outputs of the eight, two-input NAND gates form the eight inputs of the eight-input NAND gate, the output of which is connected to line 138.

Although in the preferred embodiment memory device 106 is of the type in which eight address lines uniquely select eight output bits (8×8), it is contemplated the other devices may also be employed. In particular, by employing a device in which all three central office digits uniquely address a single output gate comparator 108 may be eliminated.

The 555 detector 110 includes a three-input, negated input, AND gate 400 having a first input connected to line 381, a second input connected to line 382, a third input connected to line 384 and an output connected to line 140. When binary signals representing the digit "5" are stored in register devices 350 through 352, the detector 110 is responsive to the low logic level signals developed by decoder devices 370 through 372 on lines 381, 382 and 384 and operative to generate a high level signal on line 140.

The 90 detector 112 includes a three-input NOR gate 402 having a first input connected to line 380, a second input connected by a switch 404 to line 383, a third input connected to line 132 and an output connected to line 142.

In a PBX environment where a pre-prefix digit of "9" is employed, and thus switch 404 is closed and switch 128 is set to connect line 132 to the second output of decoder device 377, a low logic level signal is developed at all three inputs to gate 402 when the two digits "9" and "0" have been dialed causing the gate to develop a high logic level on line 142.

The 800 detector 114 includes a three-input, negated input, AND gate 406 having inputs connected to lines 385, 386 and 390 and an output connected to line 144.

The 0/1 detector 116 which includes a two-input, negated input, OR gate has inputs connected to lines 386 and 387 and an output connected to line 146.

Figure 5:
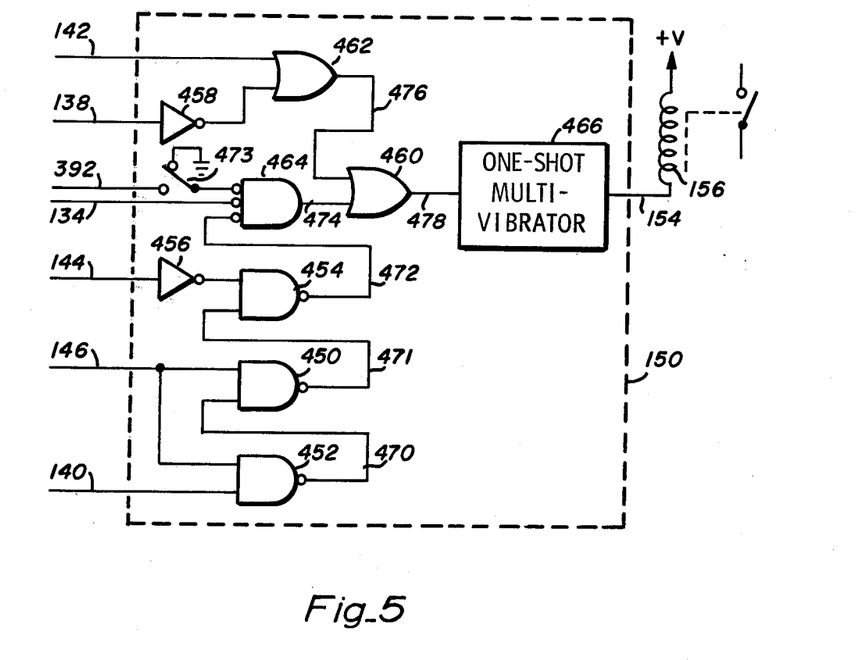
FIG. 5 is a logic diagram further illustrating the control logic illustrated in FIG. 1

Control logic 150, which is illustrated in greater detail in FIG. 5, includes three, two-input NAND gates 450, 452 and 454, two inverters 456 and 458, two, two-input OR gates 460 and 462, a three-input, negated input AND gate 464 and a one-shot multivibrator 466. NAND gate 450 has an input which is connected to line 146 and another input which is connected by a line 470 to the output of gate 452 which has one input connected to line 146 and another input connected to line 140. The output of gate 450 is connected by a line 471 to one input of gate 454 which has another input connected by inverter 456 to line 144 and an output connected by a line 472 to a first input of gate 464.

Gate 464 also has a second input connected to line 134, a third input connected to line 392 by a switch 473 and an output connected by a line 474 to an input of gate 460. The other input of gate 460 is connected by a line 476 to the output of gate 462 which has an input connected to line 142 and another input connected by a line 478 and the one-shot multivibrator 466 to line 154.

Operationally, if a "9" and a "0" are dialed causing the 90 detector 112 to generate a high logic level signal on line 142 or if as unapproved toll call is dialed causing memory 106 and comparator 108 to develop a low logic level signal on line 138, gate 462 develops a high logic level signal on line 476 causing gate 460 to develop a similar signal on line 478 to trigger multivibrator 466. When so triggered, the multivibrator generates a high logic level pulse on line 154 causing relay 156 to abort the dialed call by opening a N.O. contact of relay 156 which is in series with the ring line.

Gate 460 also generates a high logic level signal on line 478 when a high logic level signal is developed on line 474. Such a signal is generated by gate 464 in response to the combination of a low logic level signal generated on line 392 when the first digit dialed is a "9", a low logic level signal developed on line 134 when seven digits have been dialed and a low logic level signal developed on line 472. Such a signal is generated when a high logic level signal is developed on line 146 by 0/1 detector 116 when the second area code digit is a "0" or a "1" unless a high logic level is developed either on line 144 or line 140 by the 800 detector 114 or the 555 detector 110, respectively.

It is contemplated that a suitable DTMF signal generator for developing those DTMF signals commonly used for signaling the termination of a telephone call may be used in place of relay 156.

It is further contemplated that after having read the preceding disclosure, certain other alterations and modifications of the present invention will no doubt become apparent to those skilled in the art. It is therefore intended that the following claims be interpreted to cover all such alterations and modifications as fall within the true spirit and scope of the invention.

What is claimed is:

1. A telephone call restricting apparatus for connection to a telephone line for preventing the completion of a toll call by a telephone device connected to the line, the apparatus comprising:

decoder means for connection to the line, said decoder means being responsive to signals develpoed on said line as each digit of a telephone number is dialed including pre-prefix digits, prefix digits, area code digits, central office digits and local number digits and operative to generate decoded digit signals;

means for storing at least some of said decoded digit signals;

means for comparing the decoded digit signals when stored with a prestored list including information relative to whether a predetermined combination of central office digits correspond to a permissible local call, and for developing a first signal when the central office digits portion of said stored digit signals does not correspond to that of a local call;

first detector means for monitoring said stored decoded digit signals and for developing a second signal when the first digit of said stored decoded digit signals corresponds to a "0" or to a "9" followed by a "0";

second detector means for monitoring said stored decoded digit signals and for developing a third signal when the second area code digit of said stored decoded digit signals corresponds to a "0" or a "1";

third detector means for monitoring said stored decoded digit signals and for developing a fourth when the central office digits of said stored decoded digit signals correspond to the number "555";

fourth detector means for monitoring said stored decoded digit signals and for developing a fifth signal when the area code digits of said stored decoded digit signals correspond to the number "(800)";

logic means responsive to said first signal or said second signal and operative to develop a sixth signal and responsive to said third signal and operative to develop said sixth signal in the absence of said fourth signal and said fifth signal; and means responsive to said sixth signal and operative to abort the call so as to prevent completion of a toll call.

2. A telephone call restricting apparatus as recited in claim 1 wherein said signals developed on said line include a series of dialing pulses and wherein said decoder means includes:

means including retriggerable multivibrator means triggered by each pulse of a series of shaped pulses derived from said series of dialing pulses for developing a multivibrator pulse having a pulse width in excess of the period of the pulses of said series of dialing pulses, whereby one multivibrator pulse is generated for each said dialed digit; and means including counter means reset by a reset pulse derived from said multivibrator pulse, said counter means for counting the pulses of a series of clocking pulses derived from said series of dialing pulses to generate said decoded digit signals.

3. A telephone call restricting apparatus as recited in claim 2 wherein said decoder means further includes:

impedance means for isolating the apparatus from said line and for reducing and translating the level of said series of dialing pulses to develop a series of reduced level dialing pulses; and Schmitt trigger means responsive to said series of reduced level dialing pulses and operative to develop said series of shaped pulses.

4. A telephone call restricting apparatus as recited in claim 2 wherein said series of dialing pulses include switch bounce generated noise and wherein said decoder means further includes debouncer means for receiving said series of shaped pulses and for removing the switch bounce generated noise thereon to develop said series of clocking pulses; and edge detector means responsive to the leading edge of said multivibrator pulse and operative to develop said reset pulse.

5. A telephone call restricting apparatus as recited in claim 1 wherein said signals developed on said line include dual tone multifrequency signals, and wherein said decoder means includes tone decoder means responsive to said dual tone multifrequency signals and operative to develop signals from which said decoded digit signals are derived.

6. A telephone call restricting apparatus as recited in claim 1 wherein said storing means includes:

register means for serially receiving said decoded digit signals and for developing register signals representing a predetermined number of the most recently received decoded digit signals; and decoder means responsive to said register signals and operative to generate said stored decoded digit signals in decimal representation.

7. A telephone call restricting apparatus as recited in claim 1 wherein said comparing means includes:

memory means having a predetermined number of storage locations each storing information relative to whether a predetermined combination of central office digits correspond to an approved toll call, said memory means being responsive to said stored decoded digit signals representing the second and third central office digits and operative to develop a plurality of first digit indicative signals; and gating means responsive to said stored decoded digit signals representing the first central office digit and operative to select the corresponding one of said plurality of first digit-indicative signals to develop said first signal.

8. A telephone call restricting apparatus as recited in claim 1 wherein said decoder means is further operative to develop a counter driving pulse for each said dialed digit and further comprising:

dial tone detecting means responsive to a dial tone signal developed on said line and operative to develop a counter resetting signal;

counter means responsive to said counter resetting signal and to said counter driving pulses and operative to develop a sum signal indicative of the number of digits which have been dialed and wherein said comparing means includes means for inhibiting the generation of said first signal except when said sum signal indicates a predetermined number of said digits have been dialed, wherein said first detector means includes means for inhibiting the generation of said second signal except when said sum signal indicates a predetermined number of said digits have been dialed and wherein said logic means includes means for preventing said logic means from responding to said third signal except when said sum signal indicates a predetermined number of said digits have been dialed.

* * * * *